F. H. RICHARDS.
CARVING MACHINE.
APPLICATION FILED JULY 3, 1902.

922,513.

Patented May 25, 1909.
5 SHEETS—SHEET 1.

Fig. 1

Witnesses:
Robert Head
C. A. Jarvis

Inventor:
F. H. Richards

F. H. RICHARDS.
CARVING MACHINE.
APPLICATION FILED JULY 3, 1902.

922,513.

Patented May 25, 1909.
5 SHEETS—SHEET 3.

Witnesses:
Robert Head
E. A. Jarvis

Inventor:
F. H. Richards

UNITED STATES PATENT OFFICE.

FRANCIS H. RICHARDS, OF HARTFORD, CONNECTICUT.

CARVING-MACHINE.

No. 922,513.　　　　Specification of Letters Patent.　　　Patented May 25, 1909.

Application filed July 3, 1902. Serial No. 114,189.

*To all whom it may concern:*

Be it known that I, FRANCIS H. RICHARDS, a citizen of the United States, residing at Hartford, in the county of Hartford and State of Connecticut, have invented certain new and useful Improvements in Carving-Machines, of which the following is a specification.

This invention pertains to the adaptation and use of mechanical elements related and organized to effect the coöperation of a continuous feed of stock and a plurality of cutting elements operative upon said stock during a period of coincident movement therewith, such for instance as a machine for carving moldings.

Some of the objects of my invention are to provide a mechanical organization of simple design and direct and effective action, a machine designed with the object of avoiding, as far as is warrantable in a practical device, the element of friction and a relation of working members which is productive of the desired results of compact, protected and efficient design.

I have illustrated one embodiment of the principle of my invention in the accompanying drawings in which like reference characters denote like parts.

Fig. 8, a detail in perspective of the carrier.

Referring to the drawings and the form of mechanism illustrated herein, the machine is mounted and assembled on a box-like frame A, which frame has a partition B centrally located parallel with one of the side walls thereof and extending upward the greater portion of the height of said frame. 
A stock guide C is mounted longitudinally of the top of the frame A supported at either end of said frame. An aperture 2 is provided in the top of the frame A. A carrier or slide 3 is mounted in guide ways 4, 4, parallel with said stock guide and slides parallelly of said stock guide over the aperture 2 in the top of the frame A overlapping and closing said aperture throughout said movement. A yoke 5 depends from the carrier 3 through the aperture 2 in the frame A, the inner faces of said yoke forming slide ways. One of the inner faces of said yoke may be provided with an adjustable gib.

A driving shaft 7 is mounted transversely of the frame A in a bearing 8 in one side wall of the frame and a bearing 9 in the partition B. The shaft 7 projects without the frame A and is provided upon its projecting portion with a power pulley 10. A spur gear 11 is mounted fast on the shaft 7 and meshes with a spur gear 12 fast on a shaft 13 mounted parallel to the shaft 7 in a bearing 14 in the side wall of the frame A and a bearing 15 in the partition B. The spur gear 11 also meshes with a spur gear 16 fast on the shaft 17 mounted parallel to the shaft 7 in a bearing 18 in the side wall of the frame A and a bearing 19 in the partition B. The spur gears 11, 12 and 16 are all of the same diameter and therefore the shafts 7, 13 and 17 will run at the same speed. A rocking lever 20, consisting of two side pieces joined by studs, is pivoted at its lower end upon the stud 21 projecting from the lower portion of the partition B. A pin 22 at the upper end of the lever 20 carries a bearing block 23 which is engaged by and is adapted to a slight vertical movement in the yoke 5.

It will be seen that a rocking movement imparted to the rocking lever 20 will produce a reciprocating movement of the carrier 3 in the guide ways 4 parallelly of the stock guide C, and that the slight movement in an arc of the point of engagement of the rocking lever 20 with the carrier 3 will be compensated for by the vertical play of the bearing block 23 in the yoke 5.

A lever 24 is pivoted at 25 on the rocking lever 20. The upper end of the lever 24 is connected by a connecting rod 26 with a crank 27 on the shaft 13. I desire to point out the fact that if the connecting rod 26 were directly connected from the crank 27 to the rocking lever 20, the movement which would then be imparted to the carrier 3 would not be a uniform reciprocation, but would be at varying speeds. The reciprocation of the carrier 3 is to be at uniform speed in the machine illustrated, and therefore I connect the connecting rod 26 to one end of the lever 24, which is pivoted on the rocking lever 20, and provide a loose roller 28 at the lower end of the lever 24, which loose roller 28 is adapted to run upon the periphery of a cam 29 mounted fast on the shaft 17. A spring 30 connects a projection on the lever 24 with a projection on the lever 20 and maintains the roller 28 constantly in contact with the cam 29. The cam 29 is designed to complement the action of the crank 27 to produce a movement of the rocking lever 20 through the pivotal point 25 which will result in the movement of the carrier 3 at a uniform velocity. This uniform velocity may be carried out only in the direction of the feed of the stock along the stock guide C, if desired, or may also be carried out in the return movement.

The combination of the crank movement above described with the cam to complement the same acting together upon the supplemental lever 24, obviates the necessity for using a cam for obtaining the uniform velocity in the carrier 3 which would have a number of high pitched riding surfaces thereon as the cam 29 as used in the machine illustrated closely approaches the circular or eccentric form which is mechanically preferable for reasons obvious to the skilled mechanician.

Figure 1:
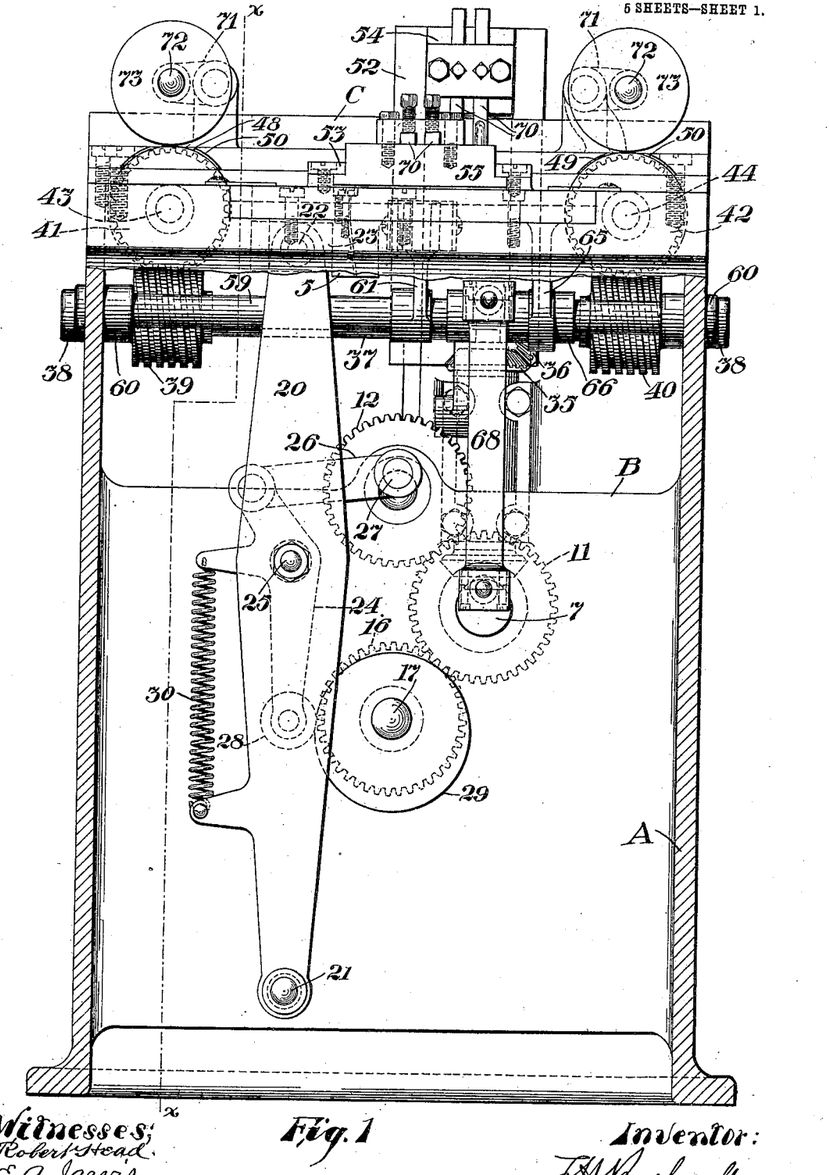
Figure 1 is a side elevation of a carving machine embodying my invention showing side wall partially cut away.
Figure 2:
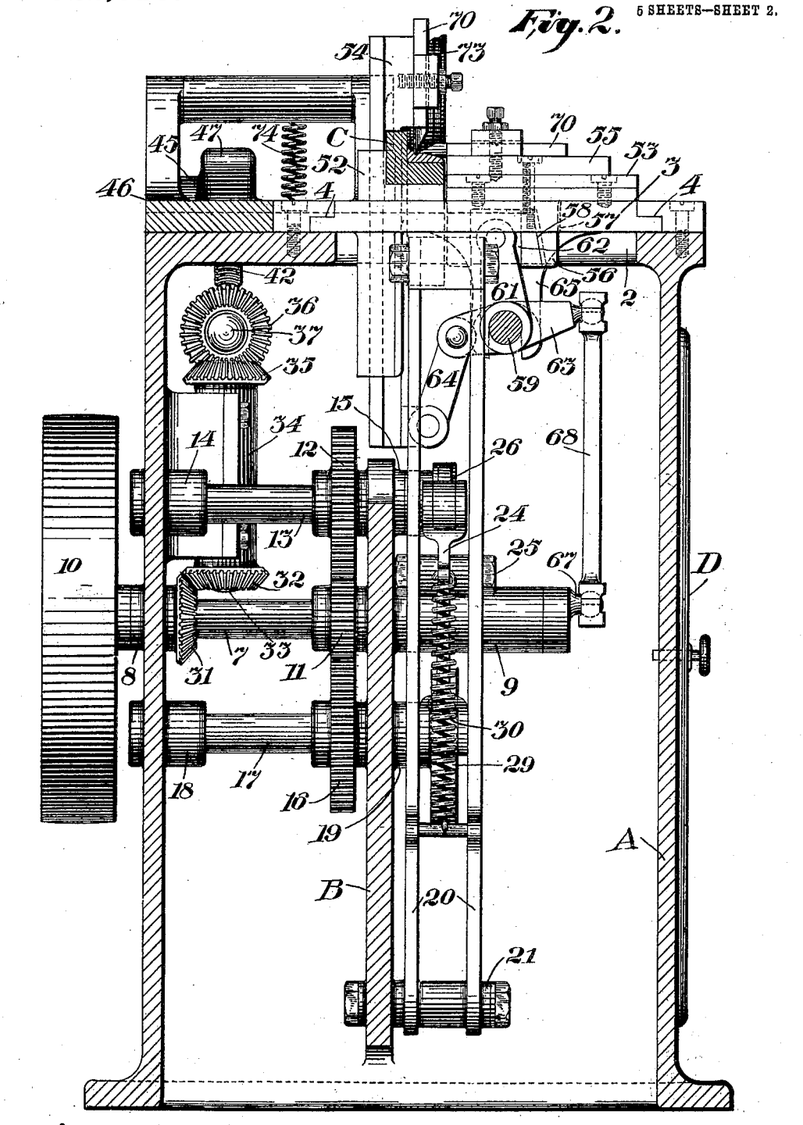
Fig. 2, a vertical cross-section on line $x$—$x$ of Fig. 1.
Figure 3:
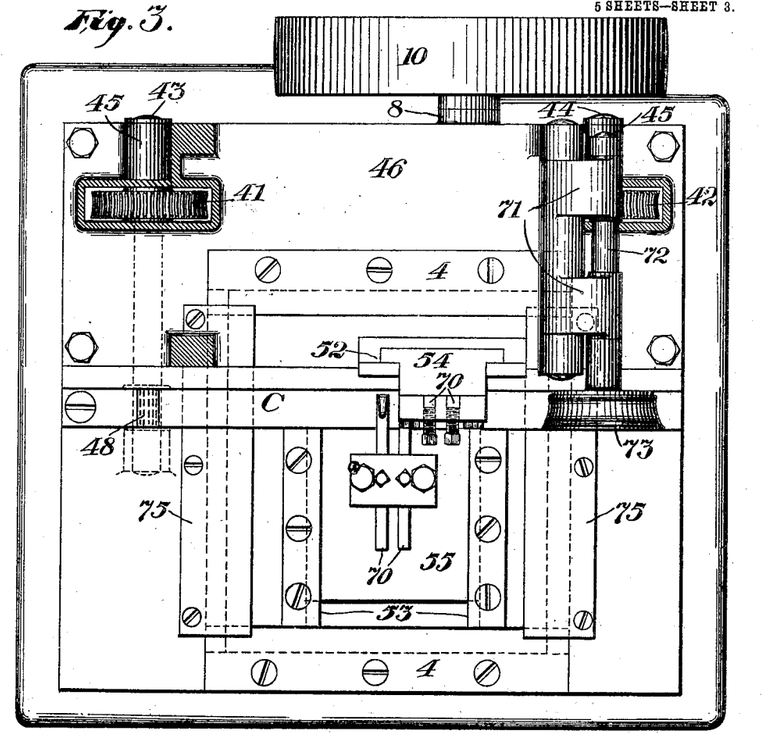
Fig. 3, a plan view showing worm wheel domes cut away.
Figures 4, 5:
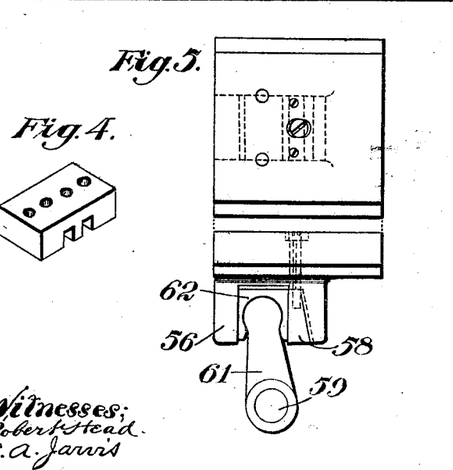
Fig. 4, a detail of tool clamp.
Fig. 5, plan and side views of horizontal carriage and actuating arm.
Figure 6:
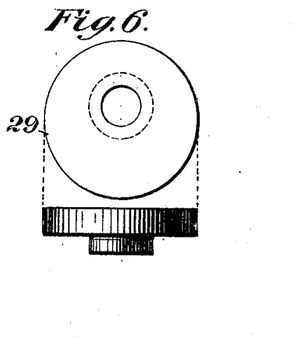
Fig. 6, side and edge views of cam.
Figure 7:
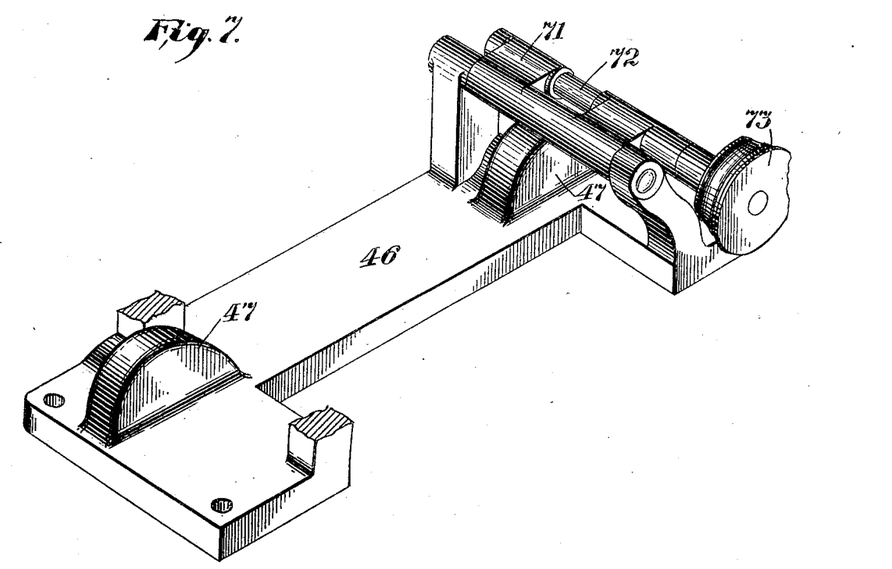
Fig. 7, a detail in perspective of platform plate and presser roll mechanism.
Figure 8:
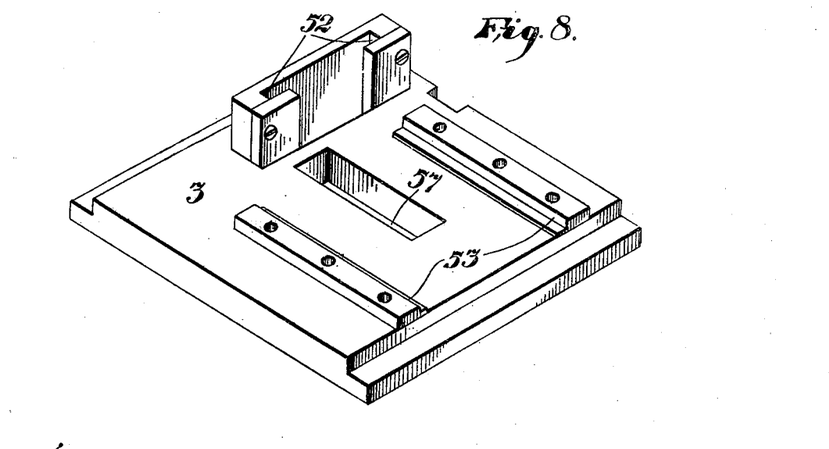
Figures 9, 10, 11:
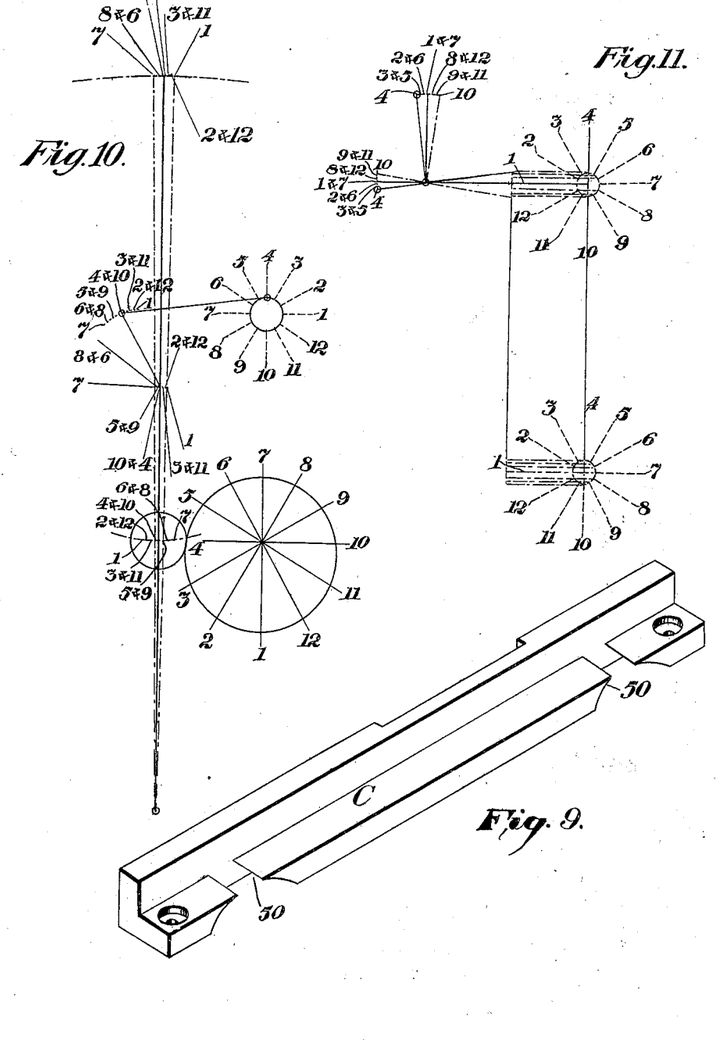
Fig. 9, a detail in perspective of the stock guide.
Fig. 10, a diagrammatical representation of the movements of the carrier actuating mechanism showing twelve consecutive positions of the several parts during one revolution of the driving shaft indicated by the numerals 1 to 12.
Fig. 11, a diagrammatical representation of the movements of the tool carriage actuating mechanism showing twelve consecutive positions of the several parts during one revolution of the driving shaft indicated by the numerals 1 to 12.

It will be seen that the lever 20 is controlled in its reciprocation or angular movement toward the left in Fig. 1 by two devices, one of which, the crank, normally has a tendency to force it in this direction through a determined angular distance, but the action of this is interfered with and controlled and modified by the other device, the movable abutment or cam 29, which at times yields in the direction of pressure of the fulcrum end of said lever 24, and in this regard may be said to be a retreating abutment, minimizing the crank action, and at other times moves against the fulcrum end and augments the movement or pressure of the crank. The extent of movement imparted by the first device is at all times controlled by the retreating and advancing abutment. The amplitude of the working stroke, the movement with the feed of the carrier 3, is positively determined and its normal stroke varied by the interference of the controlling means, comprising a cam 29 and lever 24, which at certain portions of the cycle of movements positively prevents the carrier 3 from fully responding to the action of the crank 27.

A miter gear 31 fast on the driving shaft 7 meshes with a miter gear 32 fast on a shaft 33 supported in a box bearing 34 projecting from the side wall of the frame A. The shaft 33 is driven at the same speed as shaft 7. A miter gear 35 fast on the upper end of the shaft 33 meshes with a miter gear 36 fast on a shaft 37 mounted parallel to the stock guide C in bearings 38 in the walls of the frame A. Adjacent either end of the shaft 37 are mounted fast thereon two worms 39 and 40. The worms 39 and 40 respectively mesh with worm wheels 41 and 42 respectively mounted fast on shafts 43 and 44. The shafts 43 and 44 are mounted transversely of the frame A in bearings 45 in a platform plate 46 which is securely bolted to the top of the frame A. The platform plate 46 is provided with domes 47 to arch over and inclose the worm wheels 41 and 42. The feed rolls 48 and 49 are respectively mounted fast on shafts 43 and 44, said feed rolls being of equal diameters and being driven at equal speeds from the shaft 37. The peripheries of the feed rolls 48 and 49 project through openings 50 in the stock guide C and slightly above the floor of said stock guide.

The feed rolls 48 and 49 are adapted to feed stock along the stock guide C at a uniform speed and the gearing previously described for reciprocating the carrier 3 is patterned and arranged to move said carrier 3 in the direction of the feed of the stock along the stock guide C at a velocity coincident with the velocity of stock feed along said stock guide by the feed rolls 48 and 49. Therefore it will be seen that the stock and the carrier 3 during that time when the carrier 3 is traveling in the direction of the travel of said stock will have a fixed relation as regards one another.

The carrier 3 reciprocates beneath the stock guide C and has guide ways 52 disposed therethrough which project upwardly behind the stock guide C and guide ways 53 upon the surface thereof arranged transversely of and in front of the stock guide C. A tool carriage 54 is reciprocatably mounted in the guide ways 52 and overhangs the stock guide, said tool carriage 54 being adapted to reciprocate up and down to alternately recede from and approach the face of the stock guide. A tool carriage 55 is reciprocatably mounted in the guide ways 53 and is adapted to reciprocate toward and away from the stock guide C. The guide ways 52 project downwardly beneath the carrier 3 through the aperture 2 in the frame A and the tool carriage 54 mounted therein projects within the frame A below said aperture 2. The tool carriage 55 reciprocates entirely upon the surface of the carrier 3, but has a depending yoke 56 which extends downwardly through an aperture 57 in the carrier 3 through the aperture 2 in the top of the frame A within said frame. The yoke 56 forms a vertical slide way and may be provided with an adjustable gib 58 to take up wear.

A shaft 59 is mounted in bearings 60 in the end walls of the frame A and is oscillatable therein and also capable of axial movement therein. An arm 61 is mounted fast upon the shaft 59 and projects upwardly carrying a bearing block 62 pivoted at its upper end which bearing block 62 is engaged by the yoke 56 depending from the tool carriage 55. The bearing block 62 is capable of a vertical movement in the yoke 56 which compensates for the movement in an arc of the arm 61 which arises when the shaft 59 is rocked, while at the same time said arm 61 is adapted to reciprocate the carriage 55 in the guide ways 53. A lever 63 is mounted fast upon the shaft 59 and has one end connected by a connecting rod 64 with a projection upon the tool carriage 54. When the shaft 59 is rocked the arm 63 through the connecting rod 64 will reciprocate the tool carriage 54 in the guide ways 52.

A yoke 65 depends from the carrier 3 through the aperture 2 in the top of the frame A and grasps the shaft 59 between the hub of the lever 63 and a collar 66 fast on said shaft. When the carrier 3 is reciprocated parallelly of the stock guide C, the yoke 65 grasping the shaft 59 will carry said shaft axially with said carrier 3 thereby maintaining the connections between said shaft and the tool carriages 54 and 55 on the carrier 3 in a stationary relation relative of said shaft 59 and carrier 3. The other arm of the lever 63 is connected with a crank 67 on the driving shaft 7 by a relatively long connecting rod 68 articulated with said lever 63 and crank 67 in universal joints, the said universal joints allowing for the movement of the lever 63 in an arc. The connecting rod 68 is made relatively long to render the variation in the movements of the tool carriages 54 and 55, which would occur on account of the lateral movement of the lever 63 relatively of the fixed position of the crank 67, so slight as not to produce a detrimental effect in the general working of the machine.

For convenience and for the reduction of verbiage in the claims a structure performing the work of that embodying the lever 63 and the arm 61 may be termed a multi-armed lever.

The guide ways 52 and 53 carrying the tool carriages 54 and 55 are preferably set in different planes from the carrier 3 to give the tool carriages 54 and 55 paths of reciprocation which strike the stock guide C at separate points. In the machine illustrated I have mounted two tools 70 upon each of the tool carriages 54 and 55 said tools directed in line with the travel of said tool carriages which travel in intersecting planes, said tools adapted to strike the stock lying in the stock guide at separate points to incise the contradistinctive incisions of separate repeats of a pattern to be cut thereon. The tools upon one carriage will incise the contour of two repeats or two ornaments or parts of ornaments of an ornamental design at the same time that the two tools upon the other carriage will be making incisions meeting the incisions previously made by the said first mentioned tools and chipping out a finished design. The tool carriages are moved toward and away from the stock to make the said incisions by the mechanism hereinbefore described during that period of its motion that the carrier 3 is traveling coincidently with the stock and said tools remain entirely without the stock during the return movement of the carrier 3, again incising upon the next movement with the stock to make the next succeeding incisions by each of the said sets of tools. I may employ a greater number of tools, or only one, as the particular case may require, patterning the mechanism in accordance with the principle herein illustrated to produce the desired result.

The feed of the stock is gaged to correspond with the movement of the carrier 3, or vice versa, and the said two movements are gaged to correspond with and repeat the area upon the stock operated upon by the tools, which will readily appear to one skilled in the particular art to which this invention appertains.

Upon the platform plate 46 rocking arms 71 carry shafts 72 transverse of the stock guide C, which shafts are provided with presser rolls 73 which are designed to bear upon the stock directly over the feed rolls, and are given a downward pressure thereon by springs 74 connected between the arms 71 and the frame below.

All of the shafts in the machine are restricted against longitudinal movement by the hubs of the gears mounted thereon, and collars where necessary, except the shaft 59 which, as heretofore stated, is capable of an axial movement. The frame A may be provided with a door D to admit of access to the interior of the machine.

The moving parts are designed to close all apertures leading to the interior of the frame A, thereby excluding dirt and dust from the mechanism therein. Dust guards 75 are secured to the frame A and overlap the ends of the carrier 3, covering throughout the movement of said carrier the openings at either end thereof between the guides 4.

It is obvious that various changes may be made in the details of construction and arrangement of my machine without departing from the principle or scope of this invention.

The feature of tool carriages mounted upon a reciprocatory carriage and reciprocable in different directions thereon is claimed in my co-pending application, Serial No. 107,023, filed May 12, 1902.

Having described my invention, I claim—

1. In a carving machine, the combination of a frame, a stock guide on said frame, a carrier mounted upon said frame to reciprocate parallelly of said stock guide, cutters mounted upon said carrier and reciprocable transversely of said stock guide and one another, and means connected with said cutters and carried with said carrier for actuating the cutters.

2. In a carving machine, the combination of a frame, a stock guide on said frame, a carrier mounted on said frame to reciprocate parallelly of said stock guide, cutters mounted upon said carrier and reciprocable transversely of said stock guide and one another, a drive shaft and means operable from said shaft and mounted on said frame and reciprocatable parallelly of the path of movement of said carrier, said means being connected with said cutters for actuating the same and engaged by said carrier to travel therewith.

3. In a carving machine, the combination of a frame, a stock guide on said frame, a carrier mounted upon said frame to reciprocate parallelly of said stock guide, cutters mounted upon said carrier and reciprocatable transversely of said stock guide and one another, a driver and a multi-armed lever having its arms respectively connected with said driver and said cutters and carried with said carrier.

4. In a carving machine, the combination of a frame, a stock guide on said frame, a carrier mounted on said frame to reciprocate parallelly of said stock guide, cutters mounted upon said carrier reciprocatable transversely of said stock guide and one another, a driver and a multi-armed lever mounted on said frame and synchronously reciprocatable parallelly of the path of movement of said carrier, said multi-armed lever having its arms respectively connected with said driver and said cutters and being engaged by said carrier to travel therewith.

5. In a carving machine, the combination of a frame, a stock guide on said frame, a carrier mounted on said frame to reciprocate parallelly of said stock guide, cutters mounted upon said carrier reciprocatable transversely of said stock guide and one another, a shaft mounted on said frame parallel to the path of reciprocation of the said carrier and capable of both rotative and axial movement, a driver, a plurality of fast arms on said shaft connected respectively with said cutters and said driver and an engaging member on said carrier engaging said shaft to axially reciprocate said shaft with said carrier to maintain a fixed relationship between said shaft and carrier.

6. In a carving machine, the combination of a frame, a stock guide on said frame, a carrier mounted on said frame to reciprocate parallelly of said stock guide, cutters mounted upon said carrier reciprocatable transversely of said stock guide and one another, a shaft mounted on said frame parallel to the path of reciprocation of the said carrier and capable of both rotative and axial movement, a plurality of fast arms on said shaft, a pivoted bearing block carried by one of said arms, a yoke upon one of said cutters engaged by said bearing block, a link connecting the other of said arms with the other of said cutters, a furcated arm upon said carrier embracing said shaft and shoulders on said shaft at either side of said furcated arm effecting an axial movement of said shaft with said carrier.

7. In a carving machine, the combination with a frame and a stock guide thereon of a tool carrier mounted upon said frame to reciprocate parallelly of said stock guide, a driving shaft mounted on said frame, a rocking lever pivoted on said frame and engaging said tool carrer at its free end to reciprocate the same, an auxiliary lever pivoted upon said rocking lever, a crank driven from said driving shaft and operatively connected to said auxiliary lever and a cam driven from said driving shaft and operatively connected to said auxiliary lever, said crank and cam coacting with said auxiliary lever to produce a rocking movement of said rocking lever which imparts a reciprocating movement at a uniform velocity in one direction at least to said tool carrier.

8. In a carving machine, the combination with a frame and a stock guide thereon, of a driving shaft mounted on said frame, a continuous uniform feed driven from said driving shaft, a tool carrier mounted upon said frame to reciprocate parallelly of said stock guide, a rocking lever pivoted on said frame and engaging said tool carrier at its free end to reciprocate the same, an auxiliary lever pivoted upon said rocking lever, a crank driven from said driving shaft and operatively connected to said auxiliary lever, and a cam driven from said driving shaft and operatively connected to said auxiliary lever, said crank and cam coacting with said auxiliary lever to produce a rocking movement of said rocking lever which imparts a reciprocating movement to said tool carrier coincident with the feed in the direction of said feed.

9. In a carving machine, the combination with a reciprocatable carriage, of a rocking arm engaging said carriage to reciprocate the same, an auxiliary lever pivoted upon said rocking lever, a power driven member, a crank actuated by said power driven member and linked to said auxiliary lever and a cam actuated by said power driven member operatively connected to said auxiliary lever, all organized to effect a reciprocation of said carriage at uniform speed in at least one direction and to employ the said cam of a form closely approximating a circle.

10. In a carving machine, the combination with a reciprocatable carriage, of a rocking arm engaging said carriage to reciprocate the same, an auxiliary lever pivoted upon said rocking lever, a power shaft mounted transverse of the plane of oscillation of said rocking arm, a crank driven from said power shaft and linked to one end of said auxiliary lever, and a cam driven from said power shaft and operative upon the other end of said auxiliary lever, all organized to effect such a rocking of said rocking arm by the resultant action of said crank and cam, as will produce a reciprocation of said carriage of uniform speed in one direction at least.

11. In a carving machine, the combination with a reciprocatable carriage, of operatable tools carried by said carriage, a rocking arm engaging said carriage to reciprocate the same, an auxiliary lever pivoted upon said rocking arm, a power shaft, a crank driven from said power shaft linked to said auxiliary lever, a cam driven from said power shaft and operatively connected to said auxiliary lever; said crank and cam and connections organized to rock said rocking arm to produce a reciprocation of said carriage at a uniform speed in one direction, a crank on said power shaft and a connecting rod operatively connecting said crank and tools.

12. In a carving machine, the combination with a reciprocatable carriage, of a rocking arm engaging said carriage to reciprocate the same, an auxiliary lever pivoted upon said rocking arm, a power shaft, a crank driven from said power shaft and linked to said auxiliary lever, a cam driven from said power shaft and operatively connected to said auxiliary lever, said crank and cam and connections organized to rock said rocking arm to reciprocate said carriage at a uniform speed in one direction and one or more feed rolls driven from said power shaft to feed stock in the direction of and at a speed corresponding to that of the said carriage during its uniform movement.

13. In a carving machine, the combination with a reciprocatable carriage, of a power shaft, connections between said power shaft and carriage for reciprocating the latter, one or more operatable tools mounted upon said carriage, a crank driven from said power shaft, and a connecting rod operatively connecting said crank and tools, said mechanisms related to effect a like direction of travel of the wrist of said crank and said carriage.

14. In a carving machine, the combination with a reciprocatable carriage, of a power shaft mounted transversely of the line of reciprocation of said carriage, operative connections between said power shaft and carriage to reciprocate the latter, feed rolls geared to and driven from said power shaft, a plurality of operatable tools carried by said carriage, a crank on said power shaft the wrist of which crank being adapted to move in the same general directions as said carriage and connections between said crank and tools adapted to operate the latter.

15. In a carving machine, the combination with a reciprocatable carriage and a rocking arm engaging said carriage to reciprocate the same of a driving shaft, a crank actuated from said driving shaft, a cam actuated from said driving shaft, an auxiliary lever fulcrumed upon said rocking lever and adapted to reciprocate by the resultant action of said crank and said cam, said rocking lever to effect a movement of said carriage of uniform velocity in one direction, a plurality of operatable tools carried by said carriage, a multi-armed lever operatively connected to and to operate said tools, said multi-armed lever carried with said carriage, a tool operating crank actuated from said driving shaft, a connecting rod universally articulated with said tool operating crank and said multi-armed lever and feed rolls geared to said driving shaft to develop a peripheral velocity corresponding to the velocity of said carriage during its uniform movement.

16. In a carving machine, the combination with a frame, a stock guide upon the frame, a carriage mounted upon the frame for reciprocation in a path parallel to said stock guide, a crank and lever for reciprocating said carriage, means interposed between the lever and crank for causing the excursion of the carriage in the direction of the stock feed movement to be at a constant speed, cutters mounted upon said carriage and reciprocatable transversely of said stock guide and one another, a driver and a multi-armed lever mounted on said frame and reciprocatable parallel with the path of movement of said carriage, said multi-armed lever having its arms operatively connected with said driver and said cutters, and being engaged by said carrier to travel therewith.

17. In a carving machine, the combination with a frame, of a stock guide, a carriage reciprocatory upon the frame in a path parallel to the stock guide, a pivoted lever having, at a point having movement in an arc, a connection with said carriage constructed and adapted for permitting said movements, in an arc, a crank for rocking the lever, a compensating device between the crank and lever, a plurality of sets of tools reciprocatory in transverse directions and carried by said carriage, and means for reciprocating said tools.

18. In a carving machine, the combination with a frame, of a stock guide thereon, ways on the frame parallel to said stock guide, a carriage mounted on said ways, a lever having a compensating connection with said carriage, a crank for rocking said lever, a compensating device connecting said crank and lever, a plurality of tool slides mounted on said carriage and reciprocatory in transverse paths, a multi-armed lever for reciprocating said slides, a crank for rocking said lever and a compensating device connecting said crank and lever.

19. In a carving machine, the combination with a frame, of a stock guide on the frame, ways on the frame parallel to the stock guide, a carriage mounted upon said ways, a yoke on the carriage, a bearing block mounted in the yoke, a lever pivoted at one end to the frame and at the other end to said block, a crank for rocking said lever for reciprocating said carriage, a compensating connection between said crank and lever embodying a lever centrally pivoted to the carriage actuating lever and linked at one end to said crank, a cam engaging the other end of said centrally pivoted lever, tools carried by said carriage, and means for actuating said tools.

20. In a carving machine, the combination with a frame, of a stock guide on the frame, ways on the frame parallel to the stock guide, a carriage mounted upon said ways, a yoke on the carriage, a bearing block mounted in the yoke, a lever pivoted at one end to the frame and at the other end to said block, a crank for rocking said lever for reciprocating said carriage, a compensating connection between said crank and lever embodying a lever centrally pivoted to the carriage actuating lever and linked at one end to said crank, a cam engaging the other end of said centrally pivoted lever, cutters mounted upon said carriage and reciprocatable transversely of said stock guide and one another, a driver and a multi-armed lever mounted on said frame and reciprocatable parallel with the path of movement of said carriage, said multi-armed lever having its arms reciprocatively connected with said driver and said cutters, and being engaged by said carrier to travel therewith.

21. In a carving machine, the combination with a frame, of a stock guide thereon, ways on the frame parallel to said stock guide, a carriage mounted on said ways, a lever having a compensating connection with said carriage, a crank for rocking said lever, means connecting said crank and lever for modifying the crank action imparted to said lever, a plurality of tool slides mounted on said carriage and reciprocatory in transverse paths, means for reciprocating said slides, a crank for actuating said reciprocatory means, and a compensating device connecting said crank reciprocatory means.

FRANCIS H. RICHARDS.

Witnesses:
FRED. J. DOLE,
JOHN O. SEIFERT.